US008582453B2

(12) United States Patent
Bae

(10) Patent No.: US 8,582,453 B2
(45) Date of Patent: Nov. 12, 2013

(54) SYSTEM FOR MEASURING THE TRANSMISSION BANDWIDTH FOR MULTIMEDIA STREAMING AND METHOD FOR SAME

(75) Inventor: Tae Meon Bae, Daegu (KR)

(73) Assignee: SK Planet Co., Ltd. (KR)

( * ) Notice: Subject to any disclaimer, the term of this patent is extended or adjusted under 35 U.S.C. 154(b) by 263 days.

(21) Appl. No.: 12/737,918

(22) PCT Filed: Jun. 15, 2009

(86) PCT No.: PCT/KR2009/003187
§ 371 (c)(1),
(2), (4) Date: Feb. 28, 2011

(87) PCT Pub. No.: WO2010/024520
PCT Pub. Date: Mar. 4, 2010

(65) Prior Publication Data
US 2011/0149763 A1 Jun. 23, 2011

(30) Foreign Application Priority Data

Aug. 26, 2008 (KR) .................. 10-2008-0083266

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04W 4/00* (2009.01)

(52) U.S. Cl.
USPC ........... 370/252; 370/229; 370/235; 370/253; 370/328

(58) Field of Classification Search
None
See application file for complete search history.

(56) References Cited

U.S. PATENT DOCUMENTS

| 7,581,019 | B1 * | 8/2009 | Amir et al. ..................... 709/235 |
| 2004/0228284 | A1 * | 11/2004 | Tuinstra ....................... 370/252 |
| 2005/0076136 | A1 | 4/2005 | Cho et al. |
| 2005/0097217 | A1 * | 5/2005 | Val et al. ........................ 709/233 |
| 2006/0045023 | A1 * | 3/2006 | Kim et al. ..................... 370/252 |
| 2007/0242616 | A1 | 10/2007 | Chang et al. |
| 2008/0151771 | A1 * | 6/2008 | Dowse .......................... 370/252 |

FOREIGN PATENT DOCUMENTS

| KR | 1020060020342 | 3/2006 |
| KR | 1020060074411 | 7/2006 |
| WO | 03/065683 | 8/2003 |
| WO | 2004088858 | 10/2004 |

* cited by examiner

*Primary Examiner* — Faruk Hamza
*Assistant Examiner* — Diane Lo
(74) *Attorney, Agent, or Firm* — Baker Hostetler LLP

(57) ABSTRACT

A method and system for measuring a transmission bandwidth which includes: a server for transmitting packets of multimedia data to a receiving apparatus, receiving a time stamp from the receiving apparatus, calculating a transmission bandwidth in real time from the received time stamp, and streaming the multimedia data to the receiving apparatus in accordance with the calculated transmission bandwidth; with the receiving apparatus receiving packets of the multimedia data from the server, recording received time stamp for each of received packets, and transmitting the received time stamp to the server by a predetermined cycle. According to the present invention, transmission bandwidth is measured using data actually transmitted and that streaming of media is suited to a transmission bandwidth to meet QoS (Quality of Service) requirements.

5 Claims, 4 Drawing Sheets

SYSTEM FOR MEASURING THE TRANSMISSION BANDWIDTH FOR MULTIMEDIA STREAMING AND METHOD FOR SAME

TECHNICAL FIELD

The present invention relates to a system and method for measuring a transmission bandwidth and, more particularly, to a system and method for measuring a transmission bandwidth for multimedia streaming, in which the transmission bandwidth is calculated not by transmitting proving packets to a receiving side, but rather by using packets to be transmitted to the receiving side and multimedia data is streamed on the receiving side based on the calculated transmission bandwidth, in a service for multimedia streaming in real time.

BACKGROUND ART

In general, in the Internet, a transmission bandwidth is not always guaranteed between two communicating terminals, but data is transmitted and received while a transmission bandwidth is dynamically occupied in unit of packet.

For the above reason, the communication quality is not guaranteed to a certain level, and packet loss or delay occurs according to communication conditions, thereby being capable of deteriorating the quality of a call.

Meanwhile, the Internet requires a bandwidth 5 to 10 times greater than a bandwidth for voice communication in order to transmit and receive image data in good quality and may have very poor video communication quality if, the requirement is not satisfied. In video communication, a function of controlling a transmission bandwidth is very important. Accordingly, a video terminal must previously set a transmission bandwidth to be used for video communication and must be able to transmit and receive video based on the set transmission bandwidth. This method, however, is disadvantageous in that a transmission bandwidth, dynamically varying during communication, is difficult to deal with.

FIG. 1 is a diagram illustrating a conventional method of measuring a transmission bandwidth.

Referring to FIG. 1, a server transmits two or more proving packets to a reception apparatus at step S110.

Here, the server transmits the proving packets, including a transmission time stamp, to the reception apparatus.

The reception apparatus receives the proving packets including the time stamp of a transmitted time, finds a reception interval between the two received packets, and calculates a transmission bandwidth on the basis of the reception interval at step S120.

Next, the reception apparatus transmits the calculated transmission bandwidth to the server at step S130.

The server streams multimedia data on the reception apparatus by using the transmission bandwidth received from the reception apparatus at step S140.

As described above, the conventional method of measuring a transmission bandwidth is problematic in that it requires the process of the server transmitting the proving packets to the reception apparatus and checking a result apart from transmission data.

Furthermore, the conventional method is problematic in that it occupies an additional transmission bandwidth for transmitting proving packets because it transmits the proving packets apart from transmission data.

DISCLOSURE

Technical Problem

The present invention has been made in view of the above problems, and an object of the present invention is to provide a system and method for measuring a transmission bandwidth for multimedia streaming, in which the transmission bandwidth is calculated not by transmitting proving packets to a receiving side, but by using packets to be transmitted to the receiving side and multimedia data is streamed on the receiving side based on the calculated transmission bandwidth, in a service for multimedia streaming, such as moving images, in real time.

Technical Solution

To achieve the above object, a system for measuring a transmission bandwidth according to the present invention includes a server for transmitting a plurality of packets of multimedia data to a reception apparatus, receiving a time stamp of a received time for each of the packets from the reception apparatus, calculating a transmission bandwidth using the time stamp of each of the packets, and streaming the multimedia data to the reception apparatus based on the calculated transmission bandwidths and the reception apparatus for receiving the packets of the multimedia data from the server, recording the time stamps of the respective packets, and transmitting the time stamps to the server in a predetermined cycle.

To achieve the above object, a server according to the present invention includes a communication unit for communicating with a reception apparatus; a data transmission unit for transmitting packets of multimedia data to the reception apparatus; a bandwidth calculation unit for calculating a transmission bandwidth based on a time stamp of a received time for each of the packets received from the reception apparatus; and a control unit for controlling the data transmission unit so that the data transmission unit transmits the packets of the multimedia data, controlling the bandwidth calculation unit so that the bandwidth calculation unit calculates the transmission bandwidth based on the time stamp of each of the packets received from the reception apparatus, and controlling the multimedia data based on the calculated transmission bandwidths so that the multimedia data is streamed on the reception apparatus.

Furthermore, the server further includes a storage unit for storing a size of each of the packets of the multimedia data and the time stamp of each of the packets so that the size and the time stamp corresponding to the packet.

The bandwidth calculation unit calculates the transmission bandwidth by dividing a size $L_i$ of a packet transmitted to the reception apparatus at an $i^{th}$ position, from among the packets, by a time interval $tr_{i+1} - tr_i$ between a time when the reception apparatus receives the $i^{th}$ packet and a time when the reception apparatus receives a specific packet following the $i^{th}$ packet.

The bandwidth calculation unit calculating a final transmission bandwidth of certain packets by taking a median of a certain number of transmission bandwidths for the certain packets measured in a predetermined cycle.

To achieve the above object, a reception apparatus according to the present invention includes a communication unit for communicating with a server; a reception time storage unit for recording and storing a time stamp of a received time for each of packets of multimedia data received from the server; and a control unit for controlling the time stamps of the packets of the multimedia data so that the time stamps are transmitted to the server in a predetermined cycle.

Here, the control unit controls the multimedia data based on transmission bandwidths, calculated based on the time stamps of the packets, so that the multimedia data is received from the server, after the time stamps of the packets are transmitted to the server in the predetermined cycle.

Meanwhile, to achieve the above object, a method of a system, including a server and a reception apparatus, measuring a transmission bandwidth according to the present invention includes the steps of (a) the server transmitting packets of multimedia data to the reception apparatus; (b) the reception apparatus receiving the packets of the multimedia data and transmitting a time stamp of a received time for each of the received packets; (c) the server receiving the time stamp of the packet from the reception apparatus and calculating a transmission bandwidth based on the time stamp of the packet; and (d) the server streaming the multimedia data on the reception apparatus based on the calculated transmission bandwidth.

Meanwhile, to achieve the above object, a method of measuring a transmission bandwidth according to the present invention is a method of a server, streaming multimedia data on a reception apparatus, measuring a transmission bandwidth, including the steps of (a) transmitting packets of the multimedia data to the reception apparatus; (b) receiving a time stamp of a received time for each of the packets from the reception apparatus; and (c) calculating the transmission bandwidth based on the time stamp of the packet.

Furthermore, the step (c) comprises calculating the transmission bandwidth by dividing a size $L_i$ of a packet transmitted to the reception apparatus at an $i^{th}$ position, from among the packets, by a time interval $tr_{i+1} - tr_i$ between packets received by the reception apparatus.

Furthermore, the step (c) includes calculating a final transmission bandwidth of packets by taking a median of a certain number of transmission bandwidths calculated for the packets.

Furthermore, the method further includes the step of (d) streaming the multimedia data to the reception apparatus based on the calculated final transmission bandwidth.

Advantageous Effects

According to the present invention, a transmission bandwidth can be measured not by using proving packets, but by using multimedia data that is actually transmitted.

Furthermore, additional occupation of a transmission bandwidth due to proving packets can be prevented, and multimedia data can be efficiently streamed based on a transmission bandwidth.

Furthermore, since multimedia data is streamed based on a transmission bandwidth, service to satisfy QoS (Quality of Service) can be provided.

MODE FOR INVENTION

Detailed contents of the object, technical configuration, and operational effects thereof according to the present invention will be more clearly understood from the following detailed description of the present invention to be described with reference to the attached drawings. Hereinafter, embodiments of the present invention are described in detail with reference to the accompanying drawings.

Figure 1:
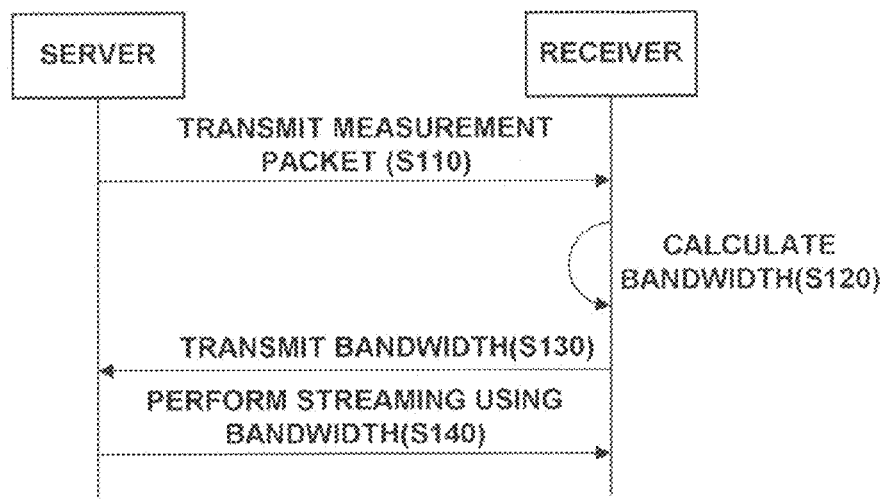
FIG. 1 is a diagram illustrating a conventional method of measuring a transmission bandwidth.
Figure 2:
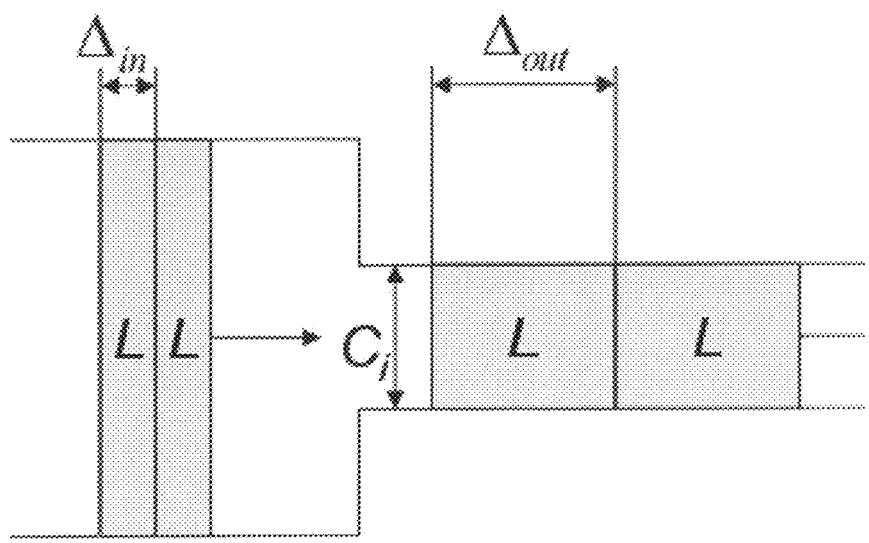
FIG. 2 is a diagram illustrating a common principle that measures a transmission bandwidth in order to help understanding of the present invention.

FIG. 2 is a diagram illustrating a common principle that measures a transmission bandwidth in order to help understanding of the present invention.

In FIG. 2, the size of each of packets consecutively transmitted from a server to a reception apparatus is L, an interval between two packets transmitted is $\Delta in$, and an interval between two packets received by the reception apparatus is $\Delta out$.

Here, a transmission bandwidth C, may be obtained according to Equation 1 below.

$$C_i = L/\Delta out \qquad \text{Equation 1}$$

In this case, the transmission bandwidth indicates not only an effective bandwidth, but also the capacity of a mobile transmission network.

According to Equation 1, the transmission bandwidth $C_i$ is calculated by dividing the size L of a packet by the interval tout between two packets received.

Figure 3:
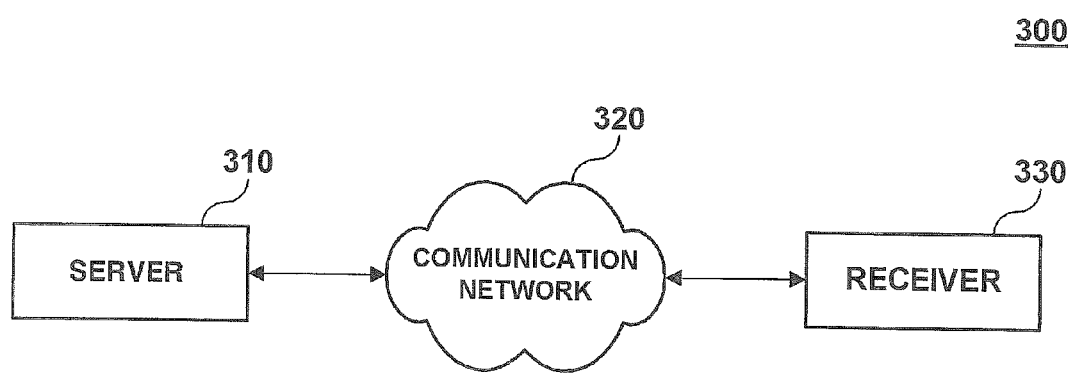
FIG. 3 is a configuration schematically showing the configuration of a system for measuring a transmission bandwidth according to an embodiment of the present invention.

FIG. 3 is a configuration schematically showing the configuration of a system for measuring a transmission bandwidth according to an embodiment of the present invention.

Referring to FIG. 3, the system 300 for measuring a transmission bandwidth according to the present invention includes a streaming server 310, a communication network 320, and a reception apparatus 330.

The streaming server 310 includes a plurality of multimedia data including various kinds of moving images and streams the multimedia data, such as moving images, on the reception apparatus 330 at the media streaming request of the reception apparatus 330.

Furthermore, the streaming server 310 transmits a plurality of packets of multimedia data to the reception apparatus 330, receives a time stamp of a received time for each of the packets from the reception apparatus 330, calculates a transmission bandwidth on the basis of the time stamp of a received time for the packet, and streams the multimedia data on the reception apparatus 330 based on the calculated transmission bandwidth.

Furthermore, the streaming server 310 stores the size of each of the packets of the multimedia data and the time stamp of a transmitted time for the packet so that the size and the time stamp correspond to each packet.

Furthermore, the streaming server 310 calculates the transmission bandwidth by dividing the size of a packet transmitted to the reception apparatus 330 at an $i^{th}$ position, from among the packets, by a time interval between the time when the reception apparatus 330 receives the corresponding packet and the time when the reception apparatus 330 receives a specific packet before and after the corresponding packet (preferably, a packet immediately before or immediately after the corresponding packet). Preferably, the streaming server 310 calculates a final transmission bandwidth of certain packets by taking the median of a certain number of the transmission bandwidths for the certain packets, measured in a predetermined cycle.

The communication network 320 provides a transmission path through which the streaming server 310 can stream multimedia data on the reception apparatus 330 and also provides an access path through which the reception apparatus 330 can access the streaming server 310. In this case, the communication network 320 may be a wireless network, such as a mobile communication network or a near-field communication network, or may be a wired network, such as the Internet.

The reception apparatus 330 receives the packets of the multimedia data from the streaming server 310, records the time stamp of a received time for each of the received packets, transmits the time stamps of the packets to the streaming server 310 in a predetermined cycle, and then receives multimedia data streamed by the streaming server 310.

Figure 4:
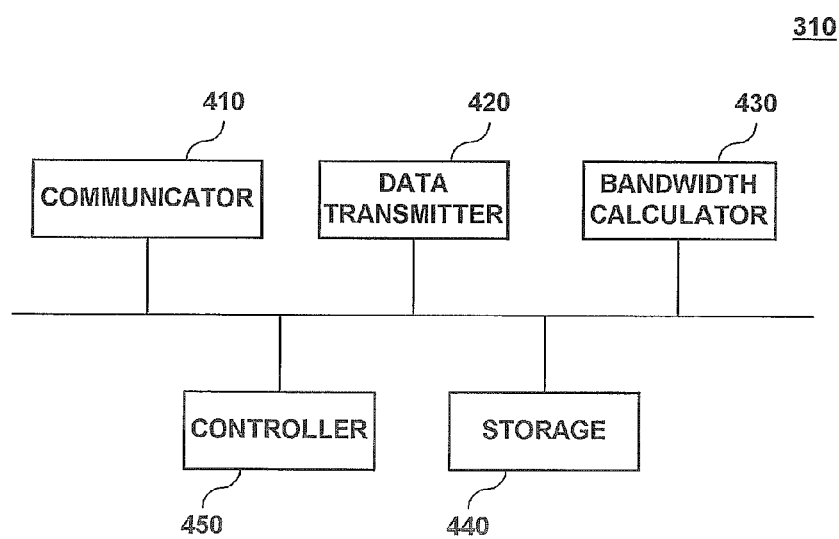
FIG. 4 is a configuration schematically showing the internal configuration of a streaming server according to an embodiment of the present invention.

FIG. 4 is a configuration schematically showing the internal configuration of the streaming server according to an embodiment of the present invention.

Referring to FIG. 4, the streaming server 310 according to the present invention includes a communication unit 410, a data transmission unit 420, a bandwidth calculation unit 430, a storage unit 440, and a control unit 450.

The communication unit 410 communicates with the reception apparatus 330 over the communication network 320.

The data transmission unit 420 transmits a plurality of packets of multimedia data to the reception apparatus 330.

The bandwidth calculation unit 430 calculates a transmission bandwidth on the basis of, a time stamp of a received time for each of the packets that are received from the reception apparatus 330.

Here, the bandwidth calculation unit 430 calculates the transmission bandwidth by dividing the size $L_i$ of a packet transmitted to the reception apparatus 330 at an $i^{th}$ position, from among the packets, by a time interval between the time when the reception apparatus 330 receives the corresponding packet and the time when the reception apparatus 330 receives a specific packet before and after the corresponding packet (preferably, a packet immediately before or immediately after the corresponding packet).

Furthermore, the bandwidth calculation unit 430 preferably calculates a final transmission bandwidth of specific packets by taking the median of a certain number of transmission bandwidths for the specific packets, measured in a predetermined cycle.

The storage unit 440 stores the size of each of the packets, transmitted to the reception apparatus 330, and a time stamp of a transmitted time for each of the packets so that the size and the time stamp correspond to each packet.

The control unit 450 controls the data transmission unit 420 so that it transmits the packets of the multimedia data, controls the bandwidth calculation unit 430 so that it calculates the transmission bandwidth on the basis of the time stamp of the packet received from the reception apparatus 330, and controls the multimedia data so that the multimedia data is streamed on the reception apparatus 330 based on the calculated transmission bandwidth.

Figure 5:
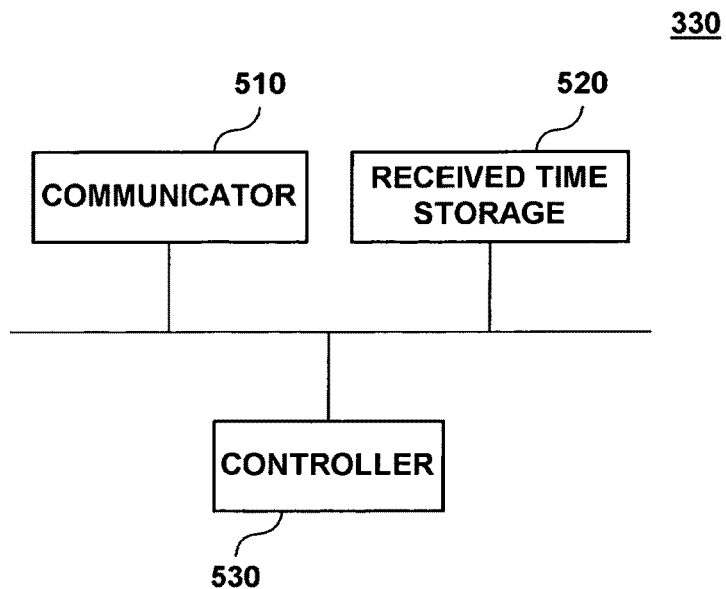
FIG. 5 is a configuration schematically showing the internal configuration of a reception apparatus according to an embodiment of the present invention.

FIG. 5 is a configuration schematically showing the internal configuration of the reception apparatus according to an embodiment of the present invention.

Referring to FIG. 5, the reception apparatus 330 according to the present invention includes a communication unit 510, a reception time storage unit 520, and a control unit 530.

The communication unit 510 communicates with the streaming server 310 over the communication network 320.

The reception time storage unit 520 records and stores a time stamp of a received time for each of packets of multimedia data received from the streaming server 310.

The control unit 530 controls the time stamps of the packets of the received multimedia data so that the time stamps are transmitted to the streaming server 310 in a predetermined cycle.

After the time stamps of the packets are transmitted to the streaming server 310 in the predetermined cycle, the control unit 530 controls the multimedia data transmitted by the streaming server 310 based on a final transmission bandwidths, calculated on the basis of the time stamps of the packets, so that the multimedia data is streamed from the streaming server 310.

Figure 6:
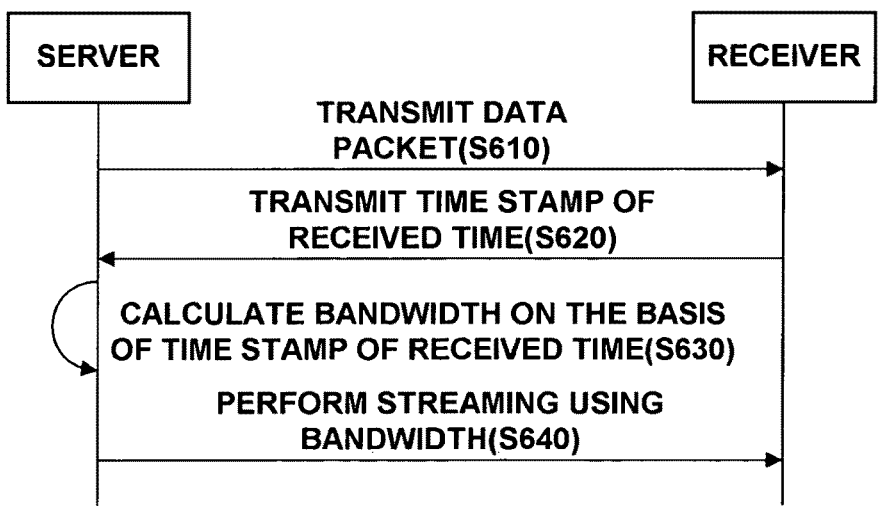
FIG. 6 is a flowchart illustrating a method of measuring a transmission bandwidth according to an embodiment of the present invention.

FIG. 6 is a flowchart illustrating a method of measuring a transmission bandwidth according to an embodiment of the present invention.

Referring to FIG. 6, the streaming server 310 transmits a plurality of packets of multimedia data to the reception apparatus 330 over the communication network 320 at step S610.

The reception apparatus 330 receives the packets of the multimedia data and transmits a time stamp of a received time for each of the received packets to the streaming server 310 at step S620.

Here, the reception apparatus 330 records the time stamps of the packets and transmits the time stamps of the packets to the streaming server 310 in a predetermined cycle.

The streaming server 310 receives the time stamps of the packets from the reception apparatus 330 and calculates a transmission bandwidth on the basis of the time stamp of each of the packets at step S630.

Furthermore, the streaming server 310 streams the multimedia data on the reception apparatus 330 based on the calculated transmission bandwidth at step S640.

Figure 7:
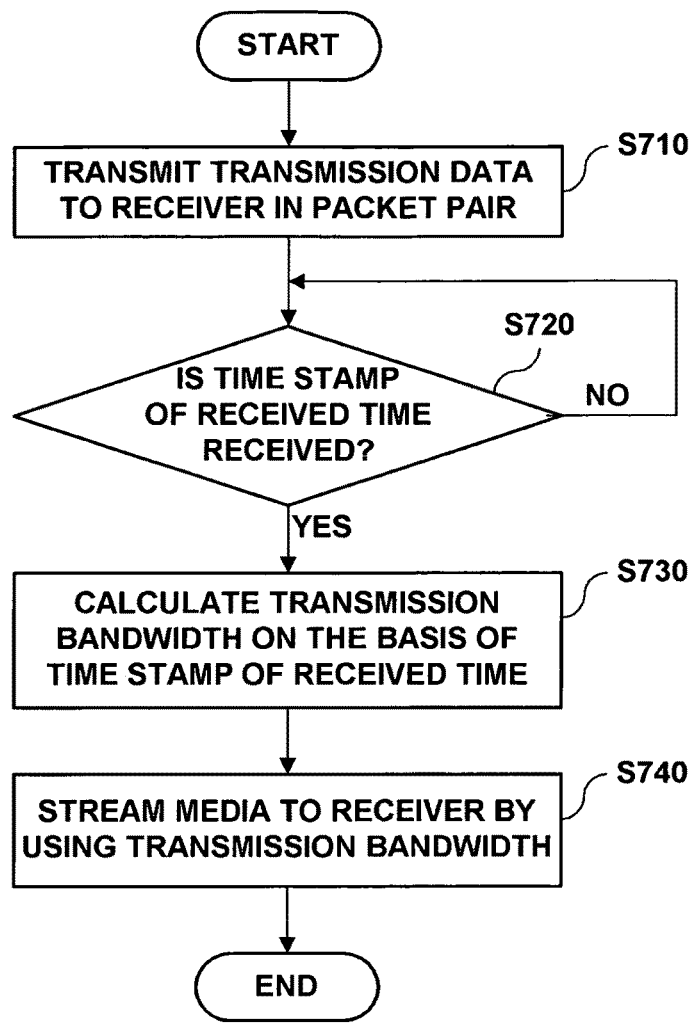
FIG. 7 is an operation flowchart illustrating a method of the streaming server measuring a transmission bandwidth according to an embodiment of the present invention.

FIG. 7 is an operation flowchart illustrating a method of the streaming server measuring a transmission bandwidth according to an embodiment of the present invention.

Referring to FIG. 7, the streaming server 310 transmits a plurality of packets of multimedia data to the reception apparatus 330 at step S710.

Here, the streaming server 310 transmits the packets of the multimedia data, each including a time stamp of a transmitted time, to the reception apparatus 330 and, at the same time, stores the size of each packet and the time stamp of a transmitted time for each packet so that the size and the time stamp correspond to each packet. In this case, the packets can be distinguished from each other based on their serial numbers.

For example, the streaming server 310 may store a time stamp of a transmitted time $ts_i$ of an $i^{th}$ packet and a time stamp of a transmitted time $ts_{i+1}$ of an $(i+1)^{th}$ packet.

Next, the streaming server 310 receives a time stamp of a received time for each of the packets from the reception apparatus 330 at step S720.

Here, the streaming server 310 receives the time stamps of the packets in a predetermined cycle from the reception apparatus 330.

The streaming server 310 calculates a transmission bandwidth on the basis of the time stamp of each of the packets through the bandwidth calculation unit 430 at step S730.

Assuming that a time stamp of a received time for an $i^{th}$ packet is $tr_i$ and a time stamp of a received time for an $(i+1)^{th}$ packet is $tr_{i+1}$, the streaming server 310 calculates a transmission bandwidth $C_i$ as in Equation 2 below.

$$C_i = L/\Delta out \qquad \text{Equation 2}$$

As in Equation 2, the streaming server 310 calculates the transmission bandwidth by dividing the size L of the $i^{th}$ packet by a time interval between the time when the corresponding packet is received and the time when a packet subsequent to the corresponding packet is received.

That is, the streaming server 310 calculates a transmission bandwidth by dividing the size $L_i$ of a packet transmitted to the reception apparatus 330 at an $i^{th}$ position, from among the packets, by a time interval $tr_{i+1} - tr_i$ between the time when the reception apparatus 330 receives the corresponding packet and the time when the reception apparatus 330 receives a packet immediately after the corresponding packet.

More particularly, considering the fact that a time stamp of a transmitted time for each of data packets when the data packets are transmitted, a receiving side acquires a time stamp of a received time corresponding to the time stamp of a transmitted time when receiving the data packets, the packets commonly have the same size, and the time stamp of a transmitted time is recorded at the same point in the packet data, the time that it takes to transmit a packet can be checked by comparing a time stamp of a received time for the corresponding packet and a time stamp of a received time for a packet immediately after or immediately before the corresponding packet. Accordingly, a state (that is, a bandwidth) of a communication network can be measured based on the checked time.

Next, the streaming server 310 calculates a final transmission bandwidth of specific packets by taking the median of a set of transmission bandwidths for the specific packets, measured in a predetermined cycle.

Next, the streaming server 310 streams the multimedia data to the reception apparatus 330 based on the final transmission bandwidth at step S740.

As described above, the present invention can realize a system and method for measuring a transmission bandwidth for multimedia streaming, in which the transmission bandwidth is calculated not by transmitting proving packets to a receiving side, but rather by using packets to be transmitted to the receiving side and multimedia data is streamed on the receiving side based on the calculated transmission bandwidth, in a service for streaming multimedia data in real time.

A person having ordinary skill in the art may implement the present invention in other detailed forms without departing from the technical spirit or indispensable characteristic of the present invention. It will be understood that the above-described embodiments are illustrative and not limitative from all aspects. The scope of the present invention is defined by the appended claims rather than the detailed description. Thus, it will be understood that the present invention should be construed to cover all modifications or variations induced from the meaning and scope of the appended claims and their equivalents.

[Industrial Applicability]

The present invention may be applied to systems for streaming multimedia data over a communication network.

Furthermore, the present invention may be applied to systems requiring a change of a transmission bandwidth when multimedia data is streamed.

Furthermore, the present invention may be applied to systems which have to provide service to satisfy QoS when multimedia data is streamed on a number of terminals.

The invention claimed is:

1. A system for streaming packets of multimedia data between a server and reception apparatus comprising:
    a communication network for providing a transmission access path through which the server can stream multimedia data to the reception apparatus and a transmission access path through which the reception apparatus can access the server,
    where said server transmits the packets of multimedia data to the reception apparatus and said reception apparatus records a time stamp of the received time for each packet of multimedia data from the server and transmits the recorded time stamp to the server,
    a control unit for controlling the time stamps of the received packets of multimedia data so that the recorded time stamps are transmitted from the receiving apparatus to the server in a predetermined cycle,
    a bandwidth calculation unit responsive to said control unit for calculating a transmission bandwidth from transmitted packets of multimedia data by dividing the packet size of one transmitted packet by a time interval based on the recordal of time stamps of successive packets and calculating a final transmission bandwidth based upon determining a median from a selected number of transmission bandwidths within said predetermined cycle, with the multimedia data to be streamed to the reception apparatus based on the final calculated transmission bandwidth.

2. The system as defined in claim 1, further comprising a storage unit for storing a size of each of the packets of the multimedia data and the time stamp of each of the packets so that the size and the time stamp corresponding to the packet.

3. The system as defined in claim 2, wherein the bandwidth calculation unit calculates the transmission bandwidth by dividing a size $L_i$ of a packet transmitted to the reception apparatus at an $i^{th}$ position, from among the packets, by a time interval $tr_{i+1} - tr_i$ between a time when the reception apparatus receives the $i^{th}$ packet and a time when the reception apparatus receives a specific packet following the $i^{th}$ packet.

4. A method for streaming packets of multimedia data between a server and reception apparatus based on a calculated transmission bandwidth comprising the steps of:
    (a) transmitting packets of multimedia data from the server to the reception apparatus;
    (b) using the reception apparatus for recording a time stamp for each packet of multimedia data received from the server and for transmitting the recorded time stamp for each of the received packet to the server
    (c) controlling the transmittal of the recorded time stamps from the reception apparatus to the server so that the recorded time stamps are transmitted to the server in a predetermined cycle;
    (d) calculating a transmission bandwidth directly from the transmitted packets of multimedia data based on the recorded time stamp of the reception apparatus of successive packets by dividing the packet size of one transmitted packet by a time interval between the recordal of time stamps for successive packets;
    (e) calculating a final transmission bandwidth in real time based upon determining a median from a selected number of transmission bandwidths within said predetermined cycle; and
    (f) streaming the multimedia data to the reception apparatus based on the final calculated transmission bandwidth.

5. The method according to claim 4, wherein the step (c) comprises calculating the transmission bandwidth by dividing a size $L_i$ of a packet transmitted to the reception apparatus at an $i^{th}$ position, from among the packets, by a time interval $tr_{i+1}-tr_i$ between a time when the reception apparatus receives the $i^{th}$ packet and a time when the reception apparatus receives a specific packet following the $i^{th}$ packet.

* * * * *